(12) United States Patent (10) Patent No.: US 7,934,911 B2
Hsieh (45) Date of Patent: May 3, 2011

(54) MULTI-AXIS TYPE FANS DRIVEN BY MAGNETIC FORCE AND POWER TRANSMISSION SYSTEM FOR THE SAME

(75) Inventor: Fa-Lien Hsieh, Taipei Hsien (TW)

(73) Assignee: Stone Technology International Co., Ltd., Taipei (TW)

( * ) Notice: Subject to any disclaimer, the term of this patent is extended or adjusted under 35 U.S.C. 154(b) by 0 days.

(21) Appl. No.: 11/665,224

(22) PCT Filed: Jul. 19, 2006

(86) PCT No.: PCT/CN2006/001753
§ 371 (c)(1),
(2), (4) Date: Apr. 12, 2007

(87) PCT Pub. No.: WO2007/009381
PCT Pub. Date: Jan. 25, 2007

(65) Prior Publication Data
US 2009/0047155 A1    Feb. 19, 2009

(30) Foreign Application Priority Data

Jul. 19, 2005   (CN) .......................... 2005 1 0084874

(51) Int. Cl.
*F04B 17/00* (2006.01)
(52) U.S. Cl. ........................................ 417/420
(58) Field of Classification Search ................. 417/420; 310/105, 103, 156.01, 152; 416/123, 124
See application file for complete search history.

(56) References Cited

U.S. PATENT DOCUMENTS

| 259,182 | A | * | 6/1882 | Martin ........................... 222/566 |
| 1,094,541 | A | | 4/1914 | Dilg |
| 1,238,365 | A | * | 8/1917 | Warriner ....................... 416/123 |

(Continued)

FOREIGN PATENT DOCUMENTS

CN          1388330 A     1/2003

(Continued)

*Primary Examiner* — Charles G Freay
*Assistant Examiner* — Alexander B Comley
(74) *Attorney, Agent, or Firm* — Muncy, Geissler, Olds & Lowe, PLLC

(57) ABSTRACT

The present invention relates to a multi-axis type fans driven by magnetic force and its power transmission system for the same, wherein said power transmission system comprises a power source provided with a spindle, at least two driven shafts in different directions, and a magnetic transmission assembly located between each driven shaft and the power source. The magnetic transmission assembly includes a driving disc provided on the spindle, on the upper side of which are circumferentially equally spaced at least three permanent magnets; a driven disc provided at the end of respective driven shaft corresponding to the spindle, on the outer side of which are equally spaced permanent magnets the number of which is equal to that of permanent magnets on the driving disc and magnetism of which is as the same as those of corresponding permanent magnets on the driving disc, so when the driving disc is rotated by the power source, the permanent magnets thereon are also rotated, and each driven disc is driven to rotate under the mutual repulsion of the same poles of the permanent magnets while each driven shaft is driven to rotate to realize the object of power transmission of multi-axis. Due to no any contact between the permanent magnets, there is no any abrasion which causes the abrasion of the power transmission system to lower the cost of production.

12 Claims, 9 Drawing Sheets

U.S. PATENT DOCUMENTS

| | | | |
|---|---|---|---|
| 2,167,641 A * | 8/1939 | Dewan | 476/11 |
| 2,878,991 A * | 3/1959 | Berman | 416/121 |
| 3,730,488 A * | 5/1973 | Gardner, Jr. | 366/262 |
| 4,459,087 A * | 7/1984 | Barge | 417/356 |
| 4,553,075 A * | 11/1985 | Brown et al. | 318/400.01 |
| 4,850,821 A | 7/1989 | Sakai | |
| 4,977,884 A * | 12/1990 | Kaufman | 126/299 R |
| 5,135,425 A * | 8/1992 | Andrews et al. | 446/133 |
| 5,514,926 A * | 5/1996 | Bushman | 310/105 |
| 5,899,320 A | 5/1999 | Miyasaka | |
| 6,194,798 B1 * | 2/2001 | Lopatinsky | 310/63 |
| 6,411,001 B1 | 6/2002 | Henderson et al. | |
| 2004/0041479 A1 | 3/2004 | French | |

FOREIGN PATENT DOCUMENTS

| | | |
|---|---|---|
| CN | 1900529 A | 1/2007 |
| GB | 2 214 232 A | 8/1989 |
| GB | 2 284 105 A | 5/1995 |
| GB | 2 428 458 A | 1/2007 |
| JP | 61-170274 | 7/1986 |
| JP | 6-193589 A | 7/1994 |
| JP | 3047790 | 4/1998 |
| JP | 2000-352395 A | 12/2000 |
| WO | WO-95/02127 A1 | 1/1995 |
| WO | WO-02/20993 A1 | 3/2002 |
| WO | WO-2005/063600 A1 | 7/2005 |

* cited by examiner

MULTI-AXIS TYPE FANS DRIVEN BY MAGNETIC FORCE AND POWER TRANSMISSION SYSTEM FOR THE SAME

BACKGROUND OF THE INVENTION

1. Field of the Invention

The present invention relates to a multi-axis type fans driven by magnetic force and its power transmission system for the same, especially to a multi-axis power device that is driven by repulsion of the magnets, and is used in light load transmission device such as fans in power transmission field.

2. Description of the Prior Arts

Ordinary power transmission devices usually use motor as a power source cooperating with a gear assembly, a chain assembly or a belt assembly to transmit power. However, when the power is being transmitting, the abrasions of the gear assembly, the chain assembly or the belt assembly cause inefficiency of the power transmission device. Moreover, the abrasions may cause the damages of the gear assembly, the chain assembly or the belt assembly so the power transmission device cannot transmit power anymore. The abrasions may also cause noises. If the ordinary power transmission device is used in light power transmission, the cost is not efficiency.

The conventional light power transmission devices have multiple types such as fans. The fan uses a motor as a power source to rotate a blade assembly mounted on a central shaft of the motor.

However, the power transmission way as previous described is only use to drive a single blade assembly. If multiple blade assemblies need to be driven to provide air flows to different directions, one way to drive multiple blade assemblies is to use multiple motors to respectively drive multiple blade assemblies to provide air flows to different directions. Nevertheless, the way increases the manufacturing costs and the volume, and the operating electricity for multiple motors is several times more than the operating electricity for a single motor. Therefore, the way does not conform to the environmental consciousness of energy conservation.

Another way is to use a single motor to drive multiple driven shafts. Multiple gears are mounted between a driving shaft of the motor and the driven shafts to transmit power. However, as previous described, using gears causes abrasions and noises. Furthermore, mounting the multiple gears is complicated and does not reduce the cost much.

To overcome the shortcomings of the conventional power transmission device as described above, the inventor bases on practical experience and professional knowledge in the art for many years and combines with the principles to research and to innovate. The inventor invents a multi-axis type fan driven by magnetic force and power transmission system for the same. After continuously researching, designing, testing and improving, the inventor finally invents the present invention that indeed has utility.

SUMMARY OF THE INVENTION

In view of the shortcomings as previously described, the inventor therefore researches to overcome the conventional problems. After continuously testing and striving, the inventor finally invents the present invention.

The present invention provides an energy saving and non-abrasion multi-axis type fans driven by magnetic force and power transmission system for the same. To achieve the objective as described, the present invention such as a fan comprises a power source provided with a spindle, at least two driven shafts in different directions and a magnetic transmission assembly located between each driven shaft and the power source. Each magnetic transmission assembly comprises:

a driving disc provided on the spindle, on an upper side of the driving disc circumferentially equally spaced at least three permanent magnets;

a driven disc provided at the end of each driven shaft corresponding to the spindle, on the outer side of the driven disc equally spaced permanent magnets wherein the number and magnetism of the permanent magnets on each driven disc are the same with the number and magnetism of the permanent magnets on the driving disc.

a blade assembly provided at the other end of each driven shaft opposite to the driven disc.

With the structure as previously described, when the driving disc is rotated by the power source, the permanent magnets thereon are also rotated counterclockwise or clock wise. Each driven disc is driven to rotate under the mutual repulsion of the same poles of the permanent magnets while each driven shaft is driven to rotate to realize the object of power transmission of multi-axis. Due to no any contact between the permanent magnets, there is no any abrasion which causes the abrasion of the power transmission system to lower the cost of production.

The foregoing description is only general conception of the present invention. Other objectives, advantages and novel features of the invention will become more apparent from the following detailed description when taken in conjunction with the accompanying drawings.

DETAILED DESCRIPTION OF THE PREFERRED EMBODIMENTS

To further explain the mechanisms and the functions for achieving the objectives of the present invention, the multi-axis type fan driven by magnetic force and power transmission system for the same in accordance with present invention will become more apparent from the following detailed description when taken in conjunction with the accompanying drawings.

Figure 1:
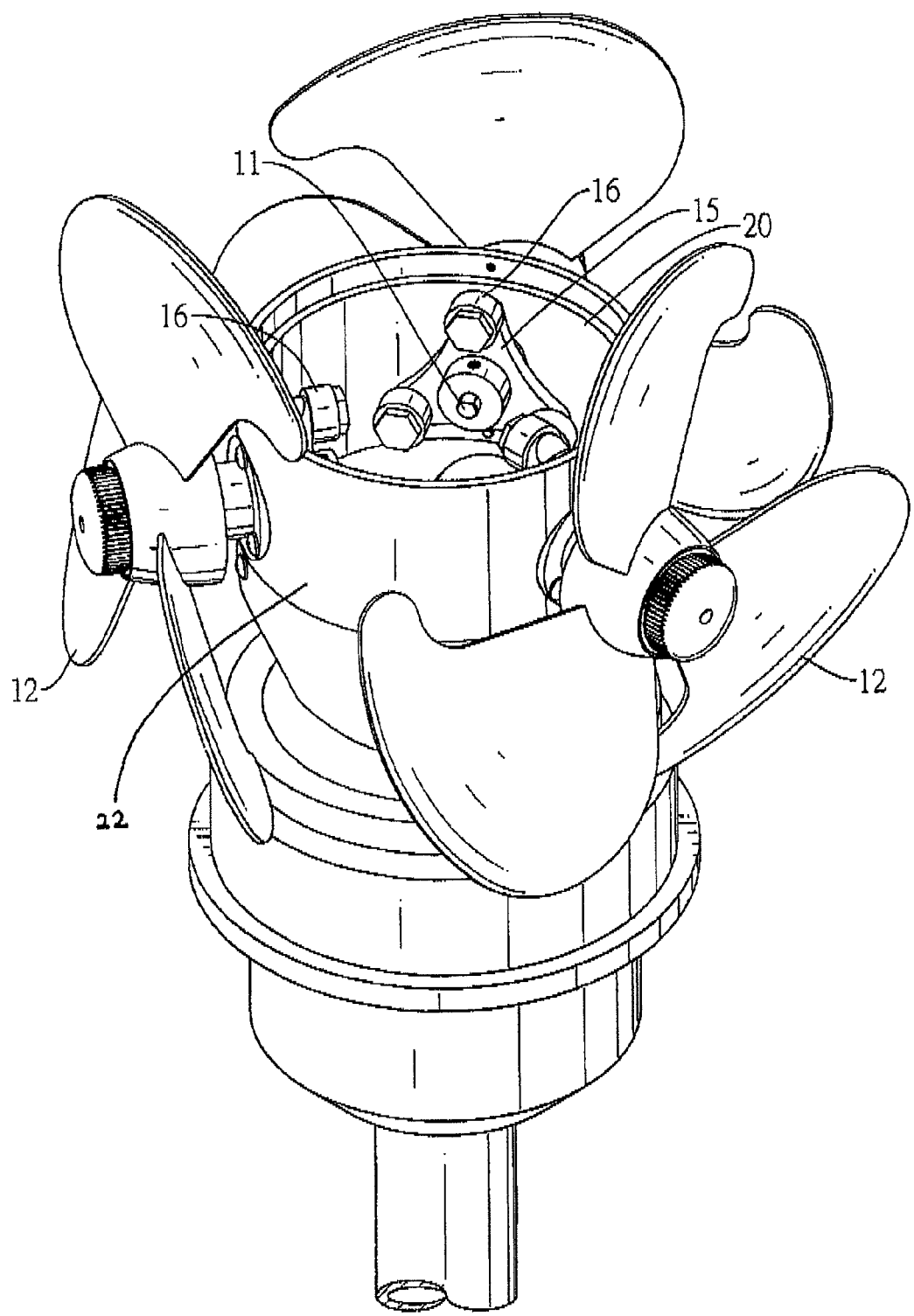
FIG. 1 is a partially perspective view of a multi-axis type fan in accordance with the present invention.
Figure 2:
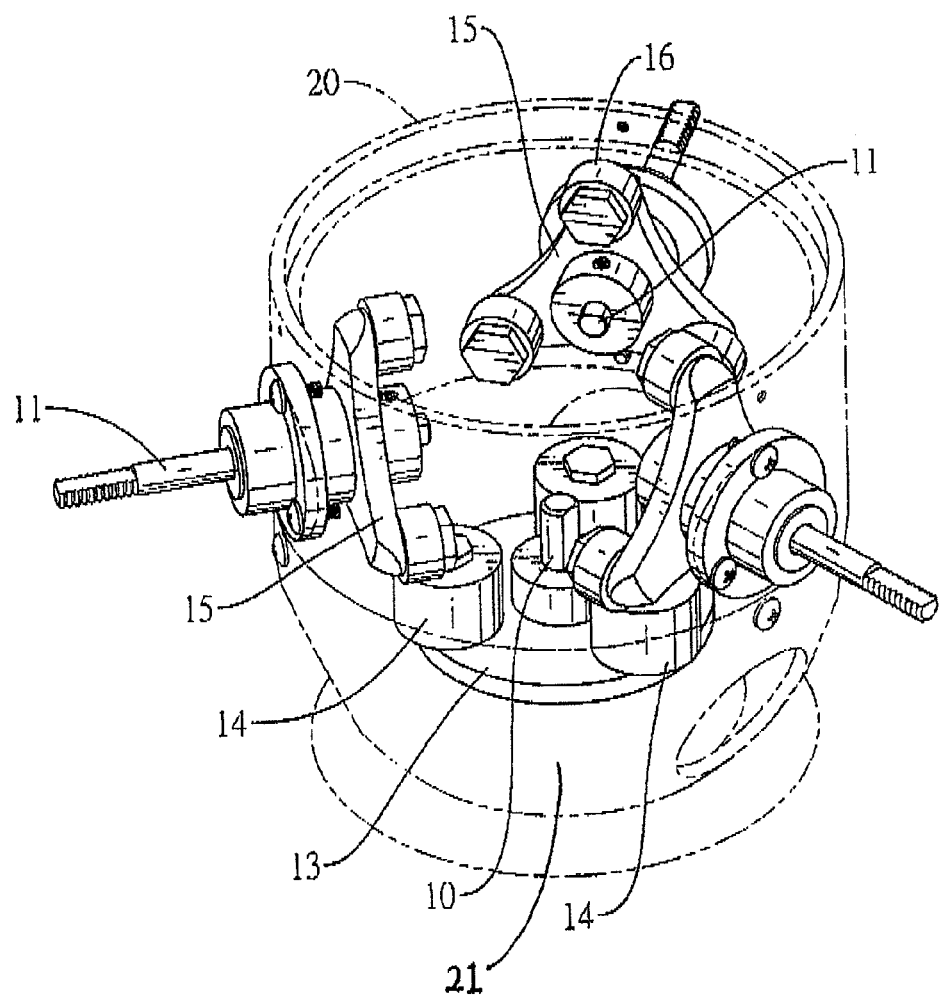
FIG. 2 is a partially perspective view of the multi-axis fan in FIG. 1.
Figure 3:
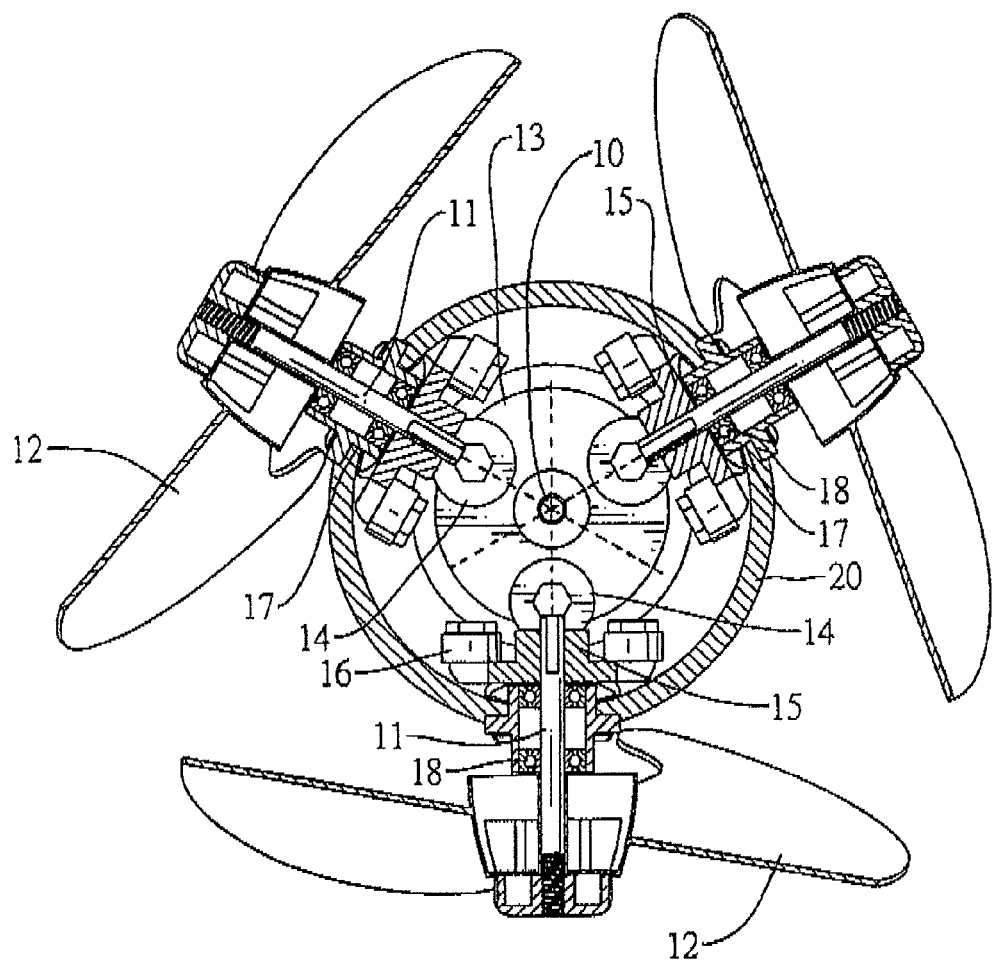
FIG. 3 is a top view in partial section of the multi-axis fan in FIG. 1.

To show the main features of the present invention more clearly, a multi-axis fan in accordance with the present invention is described below. FIG. 1 is a partially perspective view of a three-axis fan in accordance with the present invention. FIG. 2 is a partially perspective view in FIG. 1. FIG. 3 is a top view in partial section in FIG. 1. To showing easily, an outer frame and a top cover of the fan are omitted.

With reference to FIGS. 1 to 3, the multi-axis type fan driven by magnetic force and power transmission system for the same in accordance with present invention is applied with a three-axis fan. The three-axis fan comprises a motor as a power source providing power to a spindle (10), three driven shafts (11) mounted at different directions in a supporting frame (20), a magnetic transmission assembly and three blade assemblies (12). The magnetic transmission assembly is mounted between proximal ends of the driven shafts (11) and the spindle (10) of the motor. Each blade assembly (12) is mounted on a distal end of a corresponding driven shaft (11) and is opposite to the magnetic transmission assembly. The magnetic assembly comprises a driving disc (13) and multiple driven discs (15).

In a preferred embodiment, the supporting frame (20) has a bottom panel (21) and a sidewall (22). The sidewall (22) is formed on and protrudes out from the bottom panel (21). The spindle (10) is mounted rotatably through the bottom panel (21). The driven shafts (11) are separately mounted rotatably through the sidewall (22). Extension lines of the proximal ends of the driven shafts (11) intersect with each other. The intersection may be above the center of the driving disk, as shown.

The driving disc (13) is mounted securely around the spindle (10) of the motor and has three permanent magnets (14). The permanent magnets (14) are mounted on an upper side of the driving disc (13) and are arranged at identical intervals along a circumference of the driving disc (13).

Each driven disc (15) is mounted on the proximal end of a corresponding driven shaft (11) and corresponds to the spindle (10) and has three permanent magnets (16). The permanent magnets (16) are mounted on an upper side of the driven disc (15) and are arranged at identical intervals along a circumference of the driven disc (15). The number of the permanent magnets (16) on each driven disc (15) is the same with the number of the permanent magnets (14) on the driving disc (13). The corresponding surfaces of the permanent magnets (14, 16) have the same magnetic pole.

With reference to FIG. 3, the supporting frame (20) has multiple through holes (17) and multiple bearings (18). Each through hole (17) is mounted around a corresponding driven shaft (11). When the driven shafts (11) are rotated, the rotation and the friction of the supporting frame (20) cause noises and abrasions. Each bearing (18) is mounted around a corresponding driven shaft (11) in the corresponding through hole (17) to prevent the noises and the abrasions.

With reference to FIG. 2, the spindle (10) of the motor pivots the driving disc (13) to rotate the permanent magnets (14) on the driving disc (13). Because the magnetic poles of the permanent magnets (14, 16) on the driving and driven discs (13, 15) are the same, the repulsive forces between the permanent magnets (14, 16) push one of the permanent magnets (16) on each driven disc (15) to rotate to move away from the permanent magnets (14) on the driving disc (13). Therefore, the driven discs (15) are pivoted. When the permanent magnet (16) on the driven disc (15) is rotated to move away from the permanent magnets (14) on the driving disc (13), another permanent magnet (16) on the driven disc (15) is rotated to move near to the permanent magnets (14) on the driving disc (13). Therefore, the repulsive forces again rotate the permanent magnets (16) on the driven disc (15) to move away from the permanent magnets (14) on the driving disc (13). In this way, the repeatedly rotations successfully transmit the power.

When the permanent magnets (14) on the driving disc (13) push one of the permanent magnets (16) on the driven disc (15) to rotate, the permanent magnet (16) on the driven disc (15) must rotate a certain distance so the permanent magnets (14) on the driving disc (13) can push the next permanent magnet (16) on the driven disc (15). Therefore, the distance between adjacent permanent magnets (14, 16) cannot be too long or too short. For example, adjacent permanent magnets (16) connect to the center of the driven disc (15) to form two connecting lines. The included angle between the connecting lines cannot be too large or too small. Otherwise, the permanent magnets (14) on the driving disc (13) may not successfully push the permanent magnets (16) on the driven discs (15) to rotate, and the driven discs (15) cannot be pivoted or can just be pivoted back and forth. Therefore, in the preferable embodiments, each driven disc (15) and the driving disc (13) should respectively have three to six permanent magnets (14, 16).

Figure 4A:
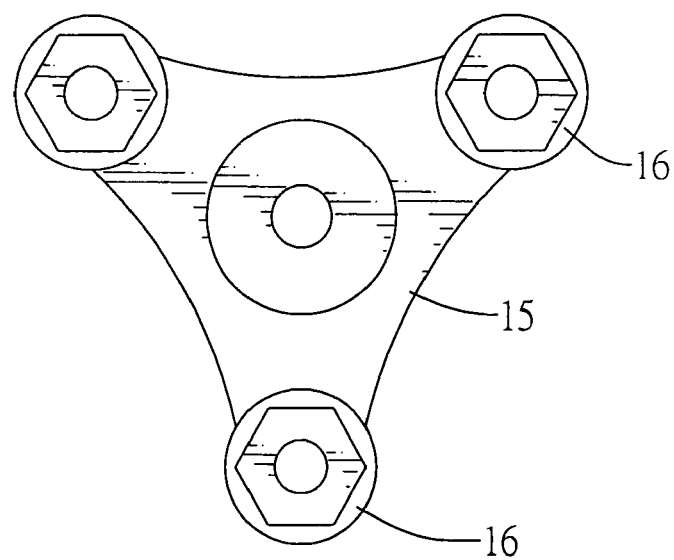
FIG. 4 is a front view of a first embodiment of a magnetic transmission assembly of the multi-axis type fan in FIG. 1.
Figure 4B:
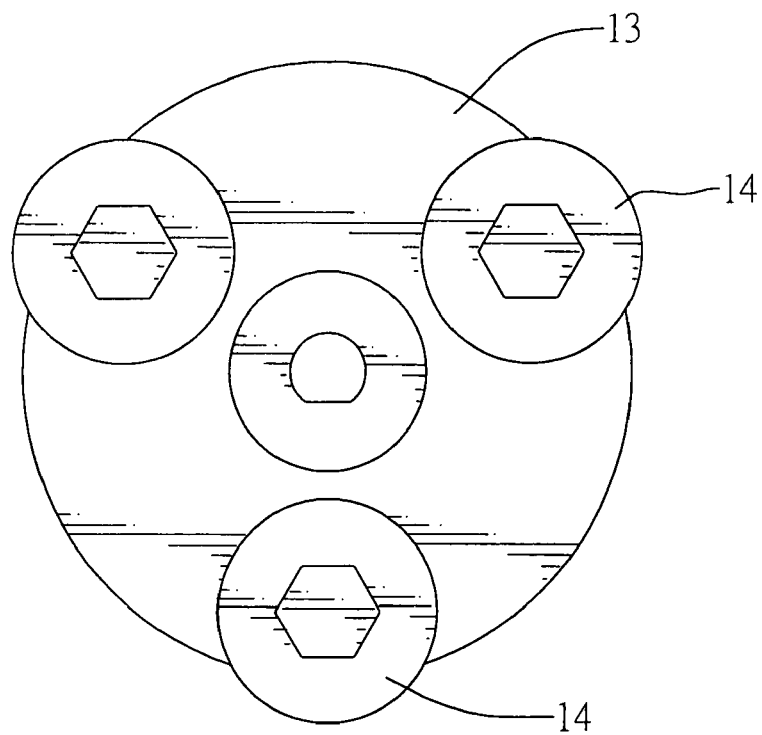

With reference to FIG. 4, it is a front view of a first embodiment of the magnetic transmission assembly. Each driven disc (15) has three permanent magnets (16), and the driving disc (13) also has three permanent magnets (14). Between a corresponding center of the corresponding disc (13, 15) and each permanent magnet (14, 16) forms a connecting line. The included angle between the adjacent connecting lines is 120 degrees.

Figure 5A:
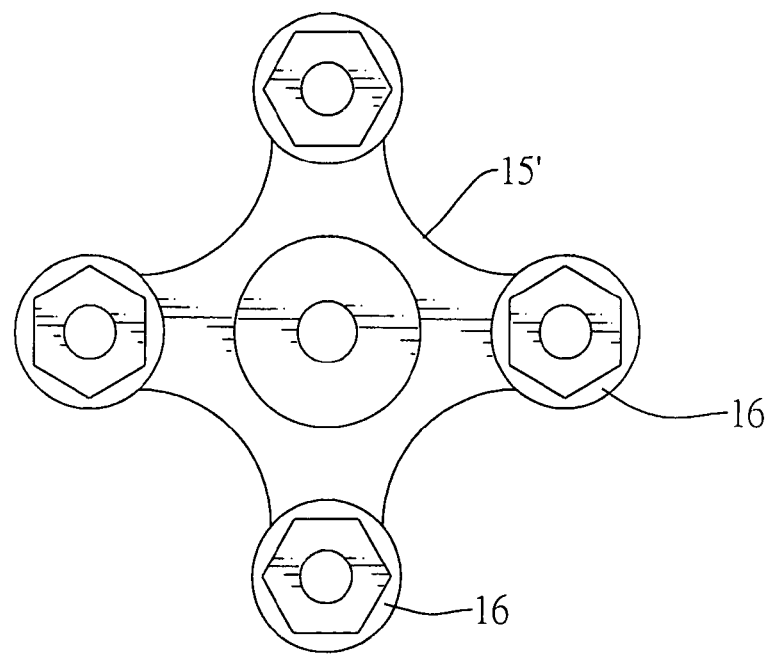
FIG. 5 is a front view of a second embodiment of a magnetic transmission assembly in accordance with the present invention.
Figure 5B:
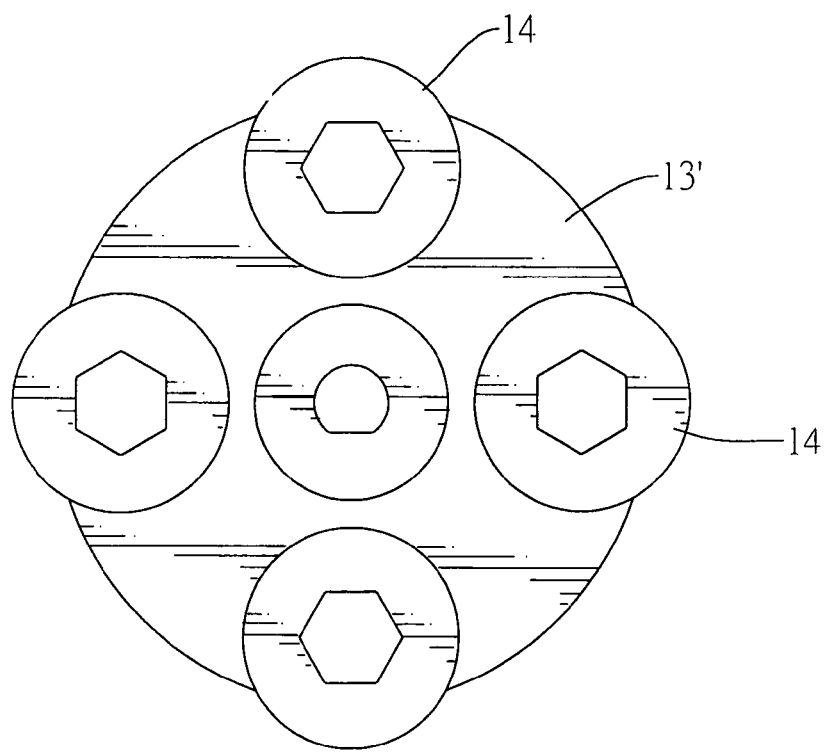

With reference to FIG. 5, it is a front view of a second embodiment of the magnetic transmission assembly. Each driven disc (15') has four permanent magnets (16), and the driving disc (13') also has four permanent magnets (14). The included angle between the adjacent connecting lines is 90 degrees.

Figure 6A:
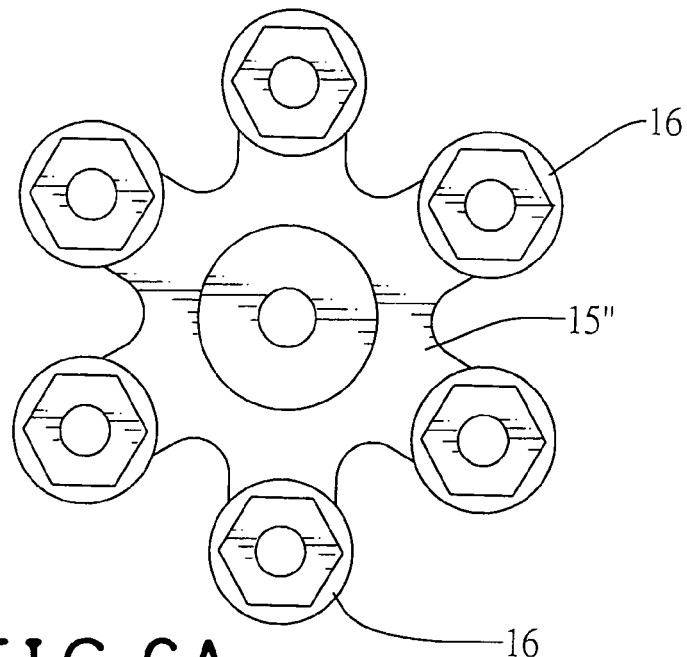
FIG. 6 is a front view of a third embodiment of a magnetic transmission assembly in accordance with the present invention.
Figure 6B:
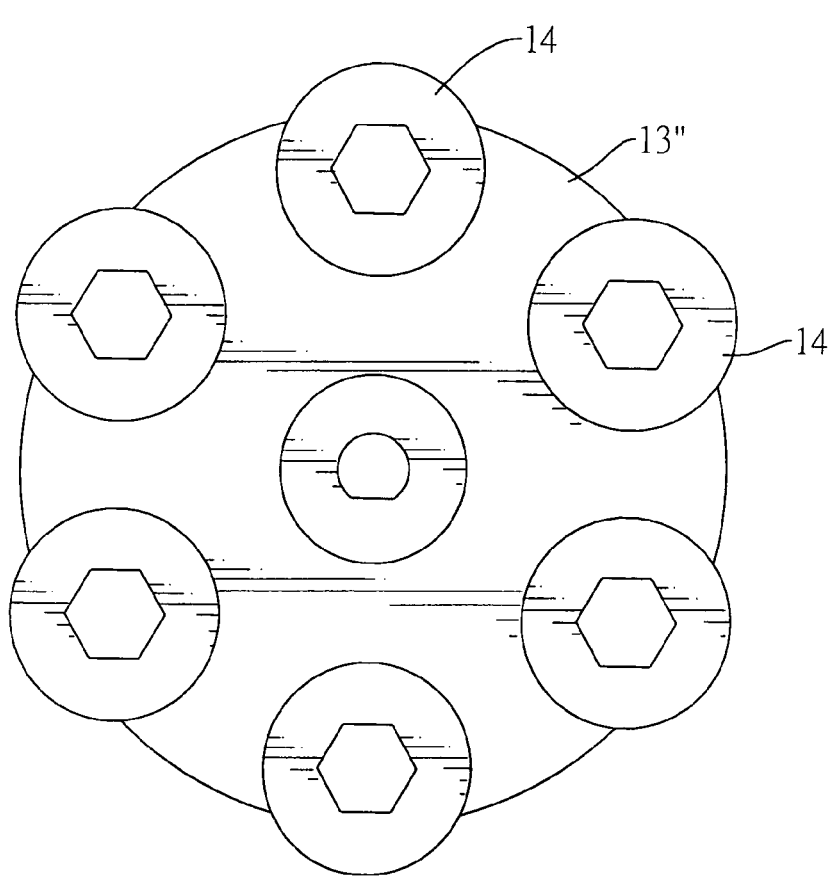

With reference to FIG. 6, it is a front view of a third embodiment of the magnetic transmission assembly. Each driven disc (15") has six permanent magnets (16), and the driving disc (13") also has six permanent magnets (14). The included angle between the adjacent connecting lines is 60 degrees.

Figure 7:
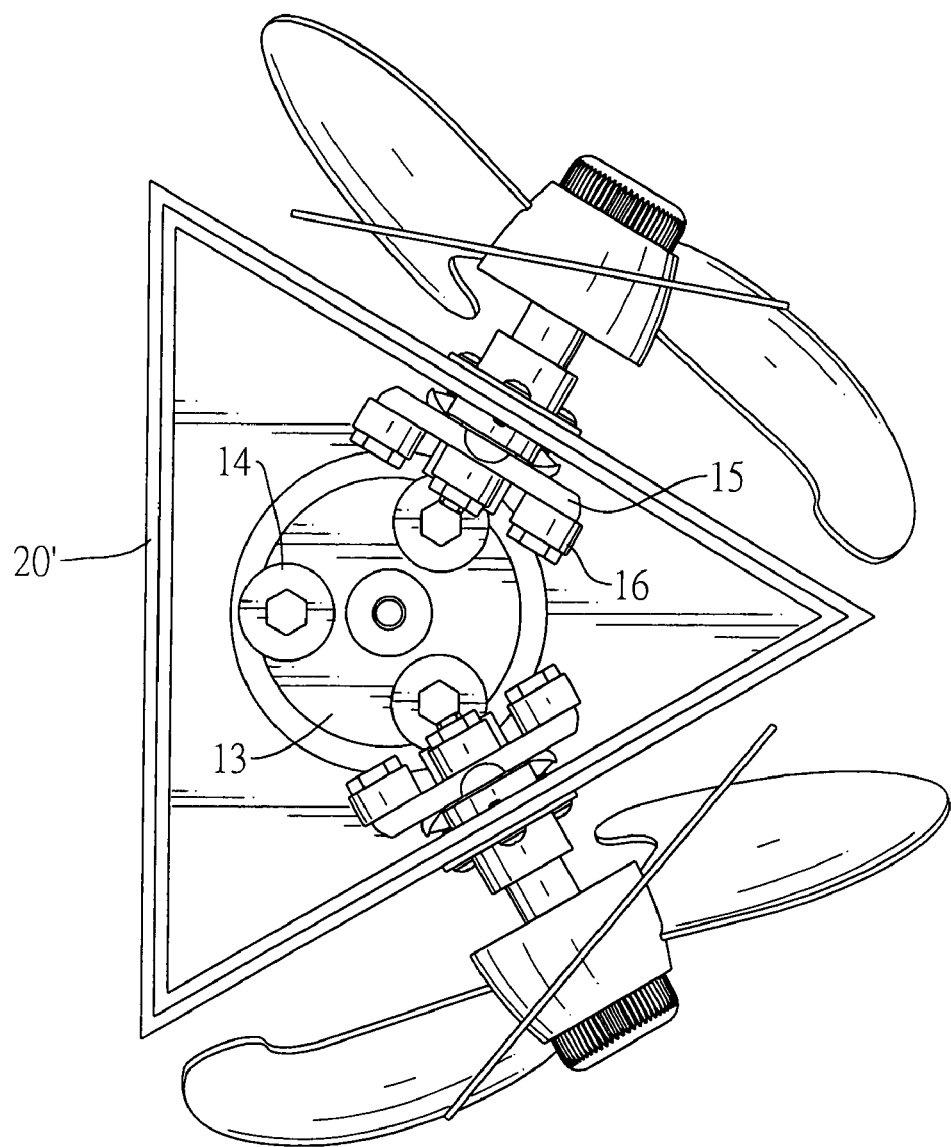
FIG. 7 is a top view of a first embodiment of a supporting frame in accordance with the present invention.
Figure 8:
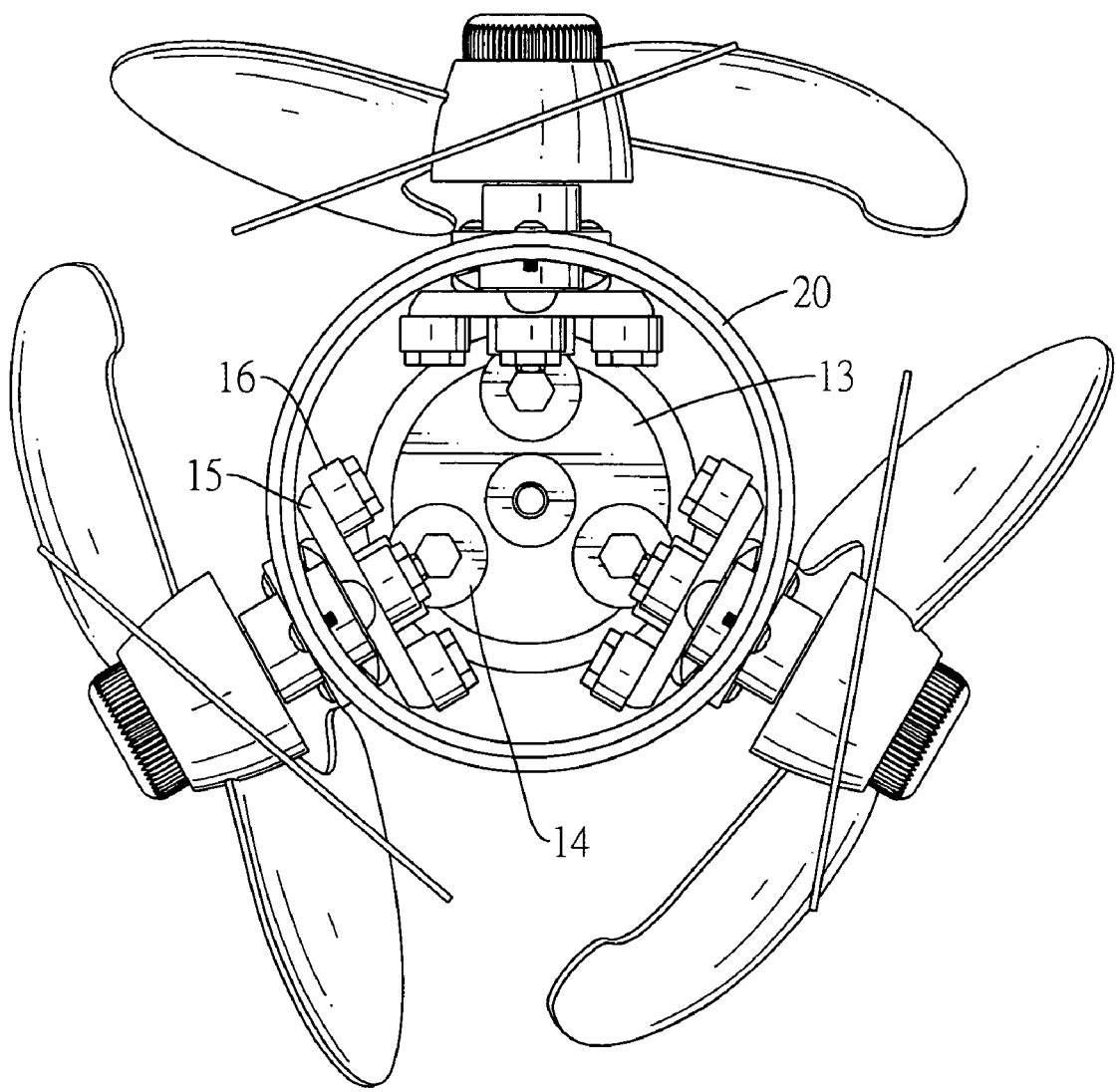
FIG. 8 is a top view of a second embodiment of a supporting frame in accordance with the present invention.
Figure 9:
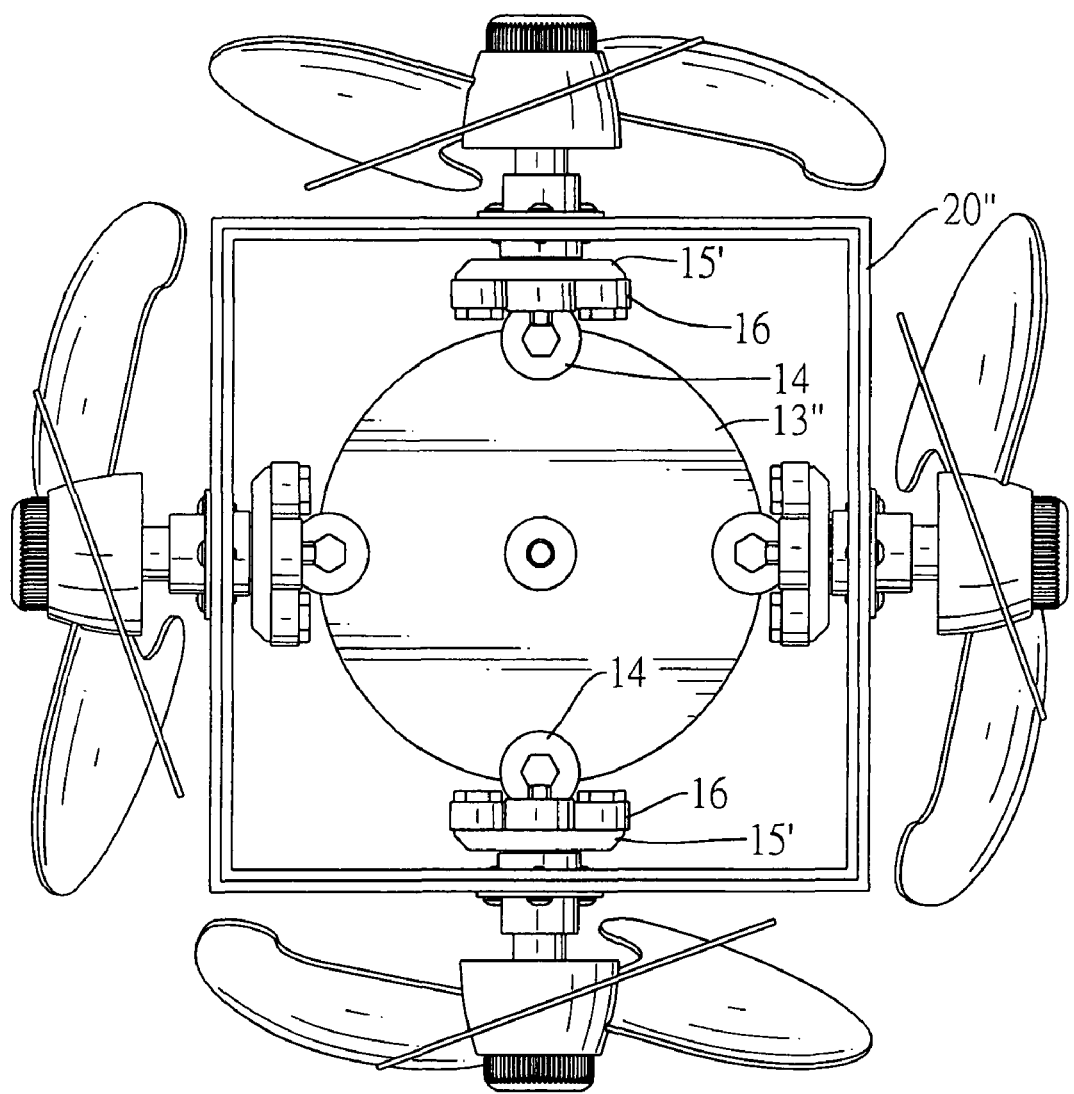
FIG. 9 is a top view of a third embodiment of a supporting frame in accordance with the present invention.

With reference to FIGS. 7 to 9, the supporting frame is not limited to a certain configuration such as a polygon or a circle. The supporting frame (20') may be triangular in cross section as shown in FIG. 7, the supporting frame (20) may be circular in cross section as shown in FIG. 8, or the supporting frame (20") may be square in cross section as shown in FIG. 9. Furthermore, the number of the driven shaft in the supporting frame (20, 20', 20") may also be changed as desired.

The present invention as described use the magnetic transmission assembly mounted between the driven shafts and the power source to transmit power from the single power source to multiple driven shafts. Furthermore, the driving disc and the driven discs do not contact to each other and only transmit power to each other base on the repulsive forces between the magnets. Therefore, no abrasions and noises are caused.

Although the fan is used as an example to describe the present invention here, the present invention is not merely a fan. Any power system using a single power source such as a motor to drive a multi-axis driven system can be adapted to the present invention. Any simply changed should be regarded as a simple change of the present invention.

Previously description only describes preferable embodiments of the present invention and should not limit the present invention. Even though numerous characteristics and advantages of the present invention have been set forth in the foregoing description, a person skilled in the art may make changes within the principles of the present invention. However, any changes within the principles of the present invention should still be limited into the scope of the present invention.

INDUSTRIAL APPLICABILITY

The present invention provides an energy saving and non-abrasion multi-axis type fans driven by magnetic force and power transmission system for the same. When the driving disc is rotated by the power source, the permanent magnets thereon are also rotated counterclockwise or clockwise. Each driven disc is driven to rotate under the mutual repulsion of the same poles of the permanent magnets while each driven shaft is driven to rotate to realize the object of power transmission of multi-axis. Due to no any contact between the permanent magnets, there is no any abrasion which causes the abrasion of the power transmission system to lower the cost of production.

What is claimed is:

1. A multi-axis fan driven by magnetic force comprising:
    a supporting frame having
    a bottom panel; and
    a sidewall being formed on and protruding out from the bottom panel;
    a power source providing power to a spindle being mounted rotatably through the bottom panel of the supporting frame;
    at least two driven shafts separately mounted rotatably through the sidewall of the supporting frame in different directions, each driven shaft being perpendicular to said spindle, and each driven shaft having a distal end and a proximal end, wherein extension lines of the proximal ends of the driven shafts intersect with each other and with an extension line of said spindle; and
    a magnetic transmission assembly mounted between the driven shafts and the spindle of the power source and comprising a driving disc mounted securely around the spindle of the power source and has at least three permanent magnets circumferentially equally spaced on an upper side of the driving disc;
    at least two driven discs, and each driven disc mounted on an end of a corresponding driven shaft, corresponding to the spindle and having multiple permanent magnets circumferentially equally spaced on an upper side of the driven disc wherein the number of the permanent magnets on each driven disc is the same with the number of the permanent magnets on the driving disc, and corresponding surfaces of the permanent magnets on the driving and driven surfaces have the same magnetic polarity; and
    at least two blade assemblies, and each blade assembly mounted on the other end of a corresponding driven shaft opposite to a corresponding driven disc.

2. The multi-axis fan as claimed in claim 1, wherein the numbers of the permanent magnets on the driving disc and each driven disc are three to six.

3. The multi-axis fan as claimed in claim 1 or 2, wherein the supporting frame is a polygon or a circle in cross section.

4. The multi-axis fan as claimed in claim 3, wherein the power source is a motor.

5. The multi-axis fan as claimed in claim 4, wherein the supporting frame has at least two through holes mounted respectively around the at least two driven shafts and at least two bearings mounted respectively around the at least two driven shafts in the at least through holes.

6. The multi-axis fan as claimed in claim 5, wherein the numbers of the permanent magnets on the driving disc and each driven disc are three.

7. The multi-axis fan as claimed in claim 6 comprising three driven shafts and three blade assemblies.

8. A multi-axis power system driven by magnetic force comprising:
    a supporting frame having
    a bottom panel; and
    a sidewall being formed on and protruding out from the bottom panel;
    a power source providing power to a spindle being mounted rotatably through the bottom panel of the supporting frame;
    at least two driven shafts separately mounted rotatably through the sidewall of the supporting frame in different directions, each driven shaft being perpendicular to said spindle, and each driven shaft having a distal end and a proximal end, wherein extension lines of the proximal ends of the driven shafts intersect with each other and with an extension line of said spindle; and
    a magnetic transmission assembly mounted between the driven shafts and the spindle of the power source and comprising a driving disc mounted securely around the spindle of the power source and has at least three permanent magnets circumferentially equally spaced on an upper side of the driving disc; and
    at least two driven discs, and each driven disc mounted on an end of a corresponding driven shaft, corresponding to the spindle and having multiple permanent magnets circumferentially equally spaced on an upper side of the driven disc wherein the number of the permanent magnets on each driven disc is the same with the number of the permanent magnets on the driving disc, and corresponding surfaces of the permanent magnets on the driving and driven surfaces have the same magnetic polarity.

9. The multi-axis power system as claimed in claim 8, wherein the numbers of the permanent magnets on the driving disc and each driven disc are three to six.

10. The multi-axis power system as claimed in claim 8, wherein the power source is a motor.

11. The multi-axis fan as claimed in claim 1, wherein the extension lines intersect above the center of the driving disk.

12. The multi-axis power system as claimed in claim 8, wherein the extension lines intersect above the center of the driving disk.

* * * * *